(12) United States Patent
Frolund et al.

(10) Patent No.: US 6,859,887 B2
(45) Date of Patent: Feb. 22, 2005

(54) METHOD TO INVOKE WIDE-AREA OBJECTS IN DISTRIBUTED COMPUTER SYSTEMS

(75) Inventors: Svend Frolund, Mountain View, CA (US); Fernando Pedone, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 09/872,454

(22) Filed: May 31, 2001

(65) Prior Publication Data

US 2002/0184553 A1 Dec. 5, 2002

(51) Int. Cl.[7] ............................................. G06F 11/00
(52) U.S. Cl. ........................... 714/4; 707/10; 719/315; 719/316
(58) Field of Search ........................ 714/4; 707/103, 707/10, 201; 719/315, 316

(56) References Cited

U.S. PATENT DOCUMENTS 5,991,766 A * 11/1999 Sadiq et al. ............ 707/103 R
6,018,805 A * 1/2000 Ma et al. ..................... 714/4
6,061,740 A * 5/2000 Ferguson et al. ........... 709/246
6,185,695 B1 * 2/2001 Murphy et al. ............... 714/4
6,230,160 B1 * 5/2001 Chan et al. ............. 707/103 X
6,397,352 B1 * 5/2002 Chandrasekaran et al. .... 714/16
6,519,652 B1 * 2/2003 Sadiq ....................... 719/316
6,654,792 B1 * 11/2003 Verma et al. ............... 709/208

OTHER PUBLICATIONS

Moser, L.E., "Eternal: Fault Tolerance and Live Upgrades for Distributed Object Systems", Jan. 2000, DARPA Information Survivability Conferenc and Exposition, 2000, DISCEX '00. Proceedings. vol. 2, pp. 184–196.*
Moser, L.E., "A Group Communication Protocol for Corba", Sep. 1999, Parallel Processing, 1999. pp. 30–36.*

* cited by examiner

Primary Examiner—Robert Beausoleil
Assistant Examiner—Christopher McCarthy

(57) ABSTRACT

A hierarchical method is provided for fault tolerance in a distributed computer system. A plurality of data centers is provided having a plurality of objects in each of the plurality of data centers. A local sub-protocol is used for dissemination of messages within a data center in the plurality of data centers and the local sub-protocol is activated from another data center of the plurality of data centers in a single round-trip message in the absence of faults.

25 Claims, 2 Drawing Sheets

METHOD TO INVOKE WIDE-AREA OBJECTS IN DISTRIBUTED COMPUTER SYSTEMS

TECHNICAL FIELD

The present invention relates generally to distributed computer systems that consist of a number of software objects that reside in a number of data centers and more specifically a fault-tolerant method to invoke wide-area objects.

BACKGROUND ART

In the past, there have been distributed systems that consist of a number of software objects that reside in a number of data centers. The software objects can be replicated databases, or other types of systems. A local-area network, such as an Ethernet, mediates communication between objects in the same data center. Communication between objects that reside in different data centers takes place via a wide-area network, such as a leased phone line. The dispersion of objects across multiple data centers allows a system to be resilient to disasters that cause a data center to go down. The multiplicity of objects within a data center makes each data center fault—tolerant: a data center can continue to deliver its intended function even if some of its objects fail.

The scenario is the following: a given object, called the initiator, wants to invoke a given method in all objects. It is necessary that objects be invoked reliably: informally, the failure of an object should not prevent other (correct) objects from being invoked. The invocation protocol should be efficient: since data centers are connected to each other via wide-area networks, and since such networks are slow and unpredictable, it is desirable to minimize the communication between data centers without compromising the reliability of the system.

There are existing solutions for so-called reliable broadcast. One common way to implement reliable broadcast is message diffusion. With message diffusion, the basic idea is that any receiver of a broadcast message relays the message to all other objects in the system. With this scheme, all correct processes eventually receive the broadcast message. The problem with message diffusion is that any correct object will propagate each message to all other objects, which means that the number of messages communicated across wide-area links is proportional to the square of the number of objects.

Another way to implement reliable broadcast is to use failure detection. If a first object receives a message from a second object, the following takes place. If the first object does not suspect the second object to have failed it does nothing. If the first object suspects the second object to have failed it relays the message to the other objects in the system. The number of message communicated across wide-area links is here proportional to the number of objects.

A protocol (a systematic exchange of messages) has long been sought that would allow invocation of the global set of objects in a fault-tolerant, but still efficient manner. The protocol would not have the number of messages proportional to the number of objects or, even worse, to the square of the number of objects. Those skilled in the art have heretofore been unsuccessful in creating such a protocol.

DISCLOSURE OF THE INVENTION

The present invention provides a hierarchical method for fault tolerance in a distributed computer system. A plurality of data centers is provided having a plurality of objects in each of the plurality of data centers. A local sub-protocol is used for dissemination of messages within a data center in the plurality of data centers and the local sub-protocol is activated from another data center of the plurality of data centers in a single round-trip message in the absence of faults.

The above and additional advantages of the present invention will become apparent to those skilled in the art from a reading of the following detailed description when taken in conjunction with the accompanying drawings.

BEST MODE FOR CARRYING OUT THE INVENTION

The present invention uses a hierarchical method or protocol. Within each data center, a local sub-protocol ensures fault-tolerant dissemination of messages within that data center. This sub-protocol is then activated from another data center in a fault-tolerant manner, which only requires a single round-trip message if there are no failures. Essentially, the invention captures a trade-off between local-area and wide-area communication, where a few more messages are exchanged within a data center in order to reduce the number of messages that go between data centers.

The sub-protocol used within a data center uses an atomic broadcast protocol, which is a well-known building block for fault-tolerant systems. In addition to reliable message dissemination, an atomic broadcast protocol also ensures that different messages are delivered in the same order to all objects, such as replicated databases. The order property makes it more expensive to implement atomic broadcast (as compared to reliable broadcast). However, the order property allows the use of a primary-backup scheme within each data center. Only the current primary object within the initiator's data center communicates with other data centers. Thus, the election of a primary object enables satisfaction of a single-round-trip constraint.

Besides the availability of an atomic broadcast protocol within each data center, the protocol makes the following assumptions:

Failure detection. The objects within a given data center have access to a failure detector that provides information about the failures of other objects in the same data center. It is assumed that the failure detector is eventually "strong". Roughly speaking this means that crashed objects are eventually permanently suspected to have crashed and eventually there is a correct object that is never suspected by another correct object. Failure detectors can make mistakes, that is, during certain periods of time, objects that have not crashed may be suspected to have crashed, and objects that have crashed are not suspected to have crashed.

Reliable channels. It is assumed that every pair of objects is connected through reliable channels. That is, if an object sends a message to another object, and neither object crashes, then the message will eventually reach its destination.

Figure 1:
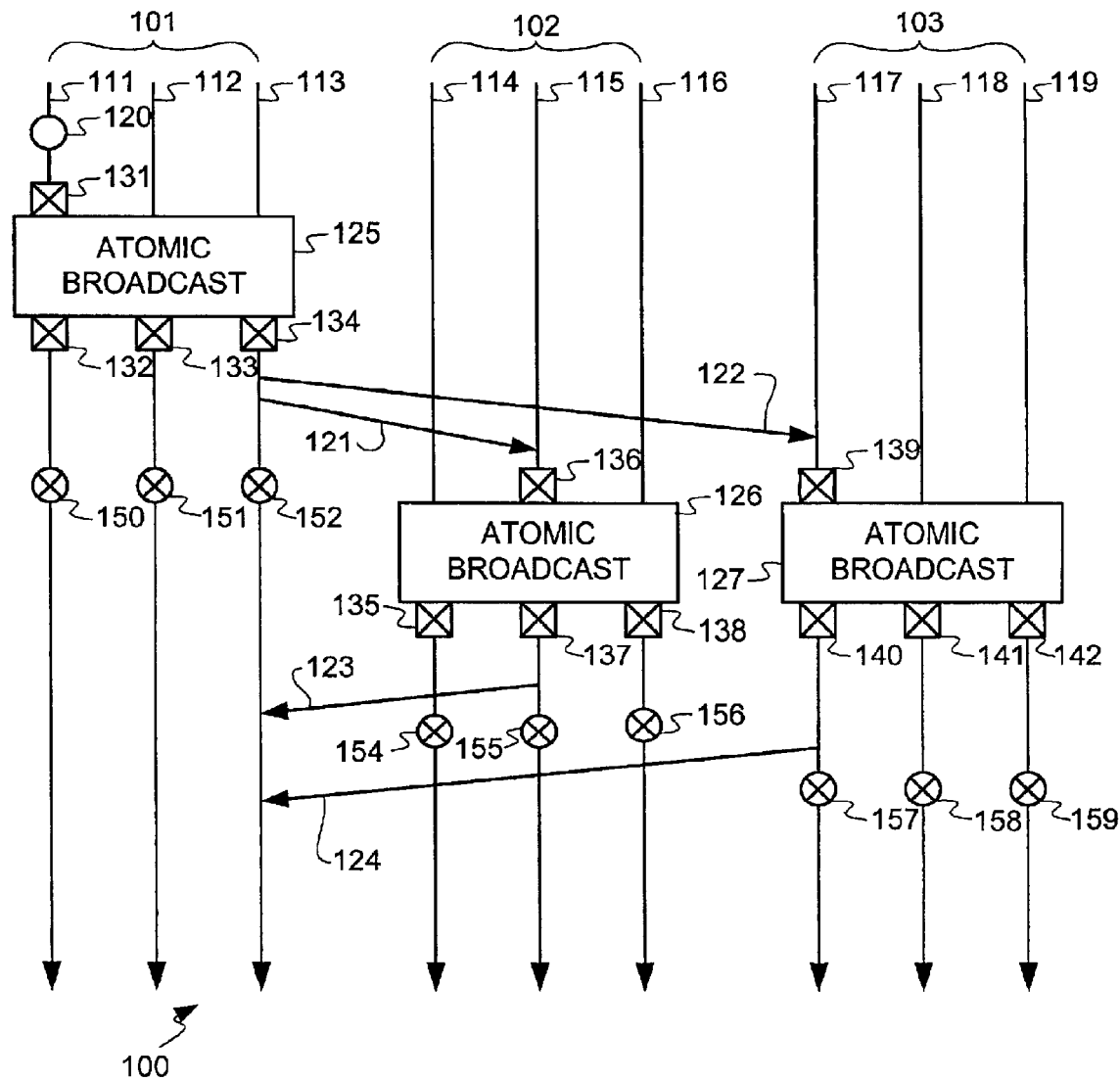
FIG. 1 is a basic (failure-free) interaction pattern of the protocol of the present invention in a distributed computer system.

Referring now to FIG. 1, therein is shown the basic (failure-free) interaction pattern of the protocol in a system 100 with three data centers 101, 102, and 103. The vertical lines represent objects 111–119. An object 111 in the data center 101 wants to invoke all other objects using an initiator invocation 120. It does so by activating an atomic broadcast protocol 125, represented by an atomic broadcast box, within the data center 101. There is a primary object 113 within the data center 101, and this primary object 113 relays messages, such as propagation messages 121 and 122, to the other data centers 102 and 103. In the other data centers 102 and 103, the receiver of the propagation message activates the local atomic broadcast protocol, atomic broadcast protocols 126 and 127, to disseminate the message locally. When the atomic broadcast protocol 126 or 127 delivers the message to the receiver, it acknowledges receipt by sending a message, such as a message 123 or 124, to the primary object 113 in the initiator's data center 101.

In the figures, connector boxes 131–142 over the atomic broadcast protocol 125, 126, and 127 are used to indicate the use of the atomic broadcast. The connector boxes 131, 136, and 139 on top indicate that a process submits a message to the atomic broadcast system. The connector boxes 132–134, 135, 137–138, and 140–142 below the atomic broadcast box indicates that the broadcast system delivers a message to an object.

Circles are used to indicate the invocation of objects. An "X" circle is the actual invocation, such as invocations 150–159, and an empty circle is the request to invoke (generated by some object), such as the initiator invocation 120.

Figure 2:
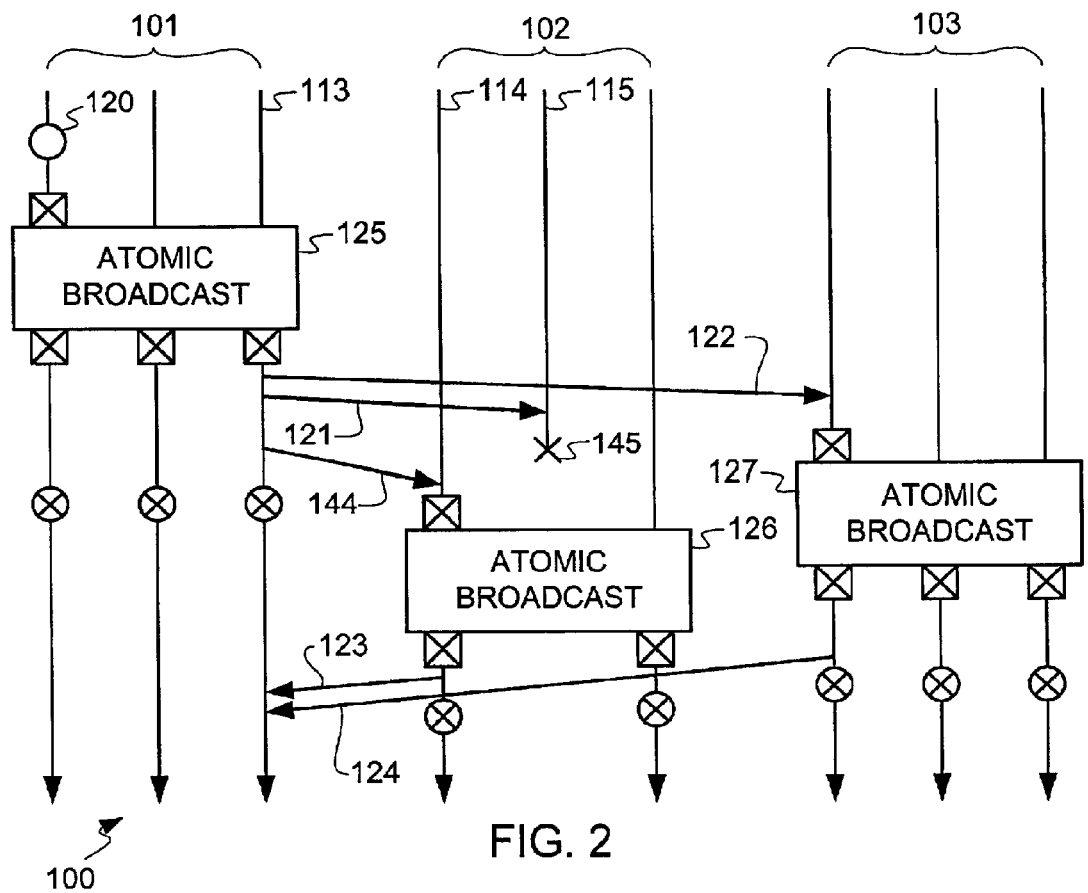
FIG. 2 is an example of the behavior of the protocol of the present invention in the presence of a failure in a data center which is not the initiator data center.

Referring now to FIG. 2, therein is shown an example of the behavior of the protocol in the presence of a failure of an object in a data center that is not responding to the initiator invocation 120, such as the object 115 of the data center 102, which has a crash 145.

The primary is the object 113 in the data center 101 (the initiator's data center) and it has chosen a default receiver, the object 115, as the object in data center 102 to receive communications. If the primary object 113 in data center 101 times out after waiting for an acknowledgement from the default receiver object 115, it simply selects another object in data center 102 to be the new receiver, e.g., a new receiver object, the object 114. It should be noted that the primary object 113 may suspect the default receiver object 115 to have crashed. This may be a false suspicion so the same message, such as an propagation message 144, may be sent to two or more objects in a given remote data center. To guarantee that each object is invoked once, it is necessary to keep track of such duplication. Standard techniques can be used for this. For example, a unique unit identifier (UUID) can be associated with each message, and the receiver can then remember which messages has been received, and only use the same message for a single invocation.

Figure 3:
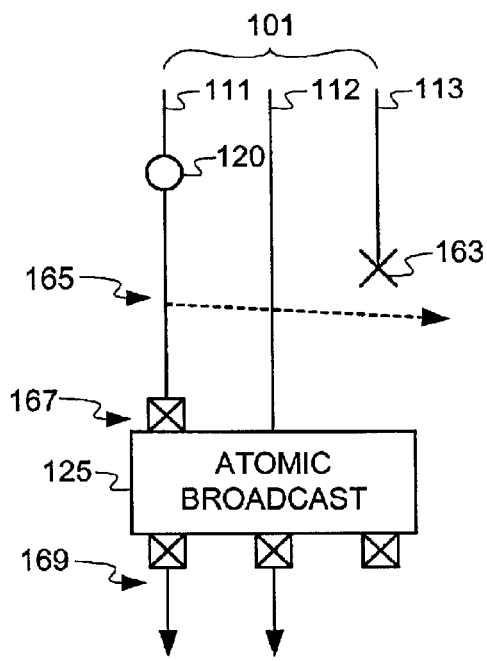
FIG. 3 is an example of the behavior of the protocol of the present invention in the presence of a failure in the data center, which is the initiator data center.

Referring now to FIG. 3, therein is shown an example of the behavior of the protocol in the presence of a failure of a primary object in a data center that is responding to the initiator invocation 120.

The initial primary is the object 113. When the primary object 113 crashes 163, the object 111 detects the crash, for example through some timeout mechanism. When suspecting the crash at a time 165, the object 111 broadcasts a special message 167 that conveys this suspicion. The suspicions are also ordered, both with each other and with the normal messages, in the atomic broadcast facility. The ordering allows the objects in data center 101 to agree on the suspicion, and they can use a pre-determined, deterministic scheme to compute the next primary object. If the scheme is deterministic (e.g., round robin) they will agree on the identity of the next primary, for example, the new primary object could be the object 112. It should be noted that the suspicion may be false. For example, a network partition may have caused the original primary object 113 to appear to have crashed. The system will remain consistent even in that case because the original primary object 113 will then deliver a special suspicion message 169 and it will voluntarily cease to be primary and become a backup.

The new primary object 112 has to ensure that all messages that were supposed to be sent to other data centers by the original primary object 113 are in fact sent. One simple way to do this is for the new primary object 112 to send every message it has seen so far. A simple optimization of that naive scheme would be for the new primary object 112 to propagate an acknowledgement message from remote data centers 102 and 103 to the other objects 111 in the initiator's data center 101. If a message has been acknowledged in this way, a backup object can safely discard it: it is not necessary to for the initiator's data center 101 to send this message to the remote data centers 102 and 103 after becoming the new primary.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth herein or shown in the accompanying drawings are to be interpreted in an illustrative and non-limiting sense.

The invention claimed is:

1. A hierarchical method for fault tolerance in a distributed computer system:
   providing a plurality of data centers;
   providing a plurality of objects in each of the plurality of data centers;
   providing a local sub-protocol within each data center;
   using each local sub-protocol to disseminate messages within its own data center to a plurality of local objects;
   activating each of the local sub-protocols from another data center of the plurality of data centers in a single round-trip message in the absence of faults;
   sending a propagation message only once to each of the plurality of data centers that is not suspected of having a receiver object that is crashed; and
   sending the propagation message at least twice to each of the plurality of data centers that is suspected of having a receiver object that is crashed.

2. The hierarchical method as claimed in claim 1 wherein:
   using the local sub-protocol uses an atomic broadcast protocol.

3. The hierarchical method as claimed in claim 1 wherein:
   using the local sub-protocol uses an atomic broadcast protocol and invokes the plurality of objects in the data center.

4. The hierarchical method as claimed in claim 1 wherein:
   using the local sub-protocol uses an atomic broadcast protocol and invokes the plurality of objects in other of the plurality of data centers by sending propagation messages;

and including:

responding to the propagation message in the other of the plurality of data centers activates a local atomic broadcast protocol.

5. The hierarchical method as claimed in claim 1 wherein:

using the local sub-protocol uses an atomic broadcast protocol and invokes the plurality of objects in other of the plurality of data centers by sending a propagation message;

and including:

responding to the propagation message in the other of the plurality of data centers includes providing an acknowledgement to the data center in the plurality of data centers from one of the plurality of objects therein.

6. The hierarchical method as claimed in claim 1 wherein:

using the local sub-protocol uses an atomic broadcast protocol and invokes the plurality of objects in other of the plurality of data centers by sending a propagation message;

and including:

responding to the propagation message in the other of the plurality of data centers includes providing an acknowledgement to the data center in the plurality of data centers from one of the plurality of objects therein; and waiting a time for the acknowledgement and sending a second propagation message to another of the plurality of objects in the other of the plurality of data centers if the acknowledgement is not received within the time.

7. The hierarchical method as claimed in claim 1 wherein:

using the local sub-protocol uses an atomic broadcast protocol and invokes the plurality of objects in other of the plurality of data centers by sending a first propagation message;

and including:

responding to the first propagation message in the other of the plurality of data centers includes providing an acknowledgement to the data center in the plurality of data centers from one of the plurality of objects therein;

waiting a time for the acknowledgement and activating a second propagation message to another of the plurality of objects in the other of the plurality of data centers if the acknowledgement is not received within the time; and sending the first and second propagation messages includes sending first and second unique identifiers.

8. The hierarchical method as claimed in claim 1 wherein:

activating the local sub-protocol includes using a unique identifier.

9. The hierarchical method as claimed in claim 1 wherein:

providing the plurality of objects includes providing a primary object in one of the plurality of data centers that communicates with the other of the plurality of data centers.

10. The hierarchical method as claimed in claim 1 wherein:

using the local sub-protocol includes detecting failures within the plurality of objects within each of the plurality of data centers.

11. The hierarchical method as claimed in claim 1 wherein:

using the local sub-protocol includes determining when faults occur in the plurality of objects in a local data center.

12. The hierarchical method as claimed in claim 1 wherein:

using the local sub-protocol includes determining when faults occur in the plurality of objects in a local data center;

and including:

determining an alternate object in the plurality of objects in the local data center to become a backup primary object when a primary object has a fault.

13. The hierarchical method as claimed in claim 1 wherein:

using the local sub-protocol includes developing a suspicion of the occurrence of faults in the plurality of objects in a local data center;

and including:

determining an alternate object in the plurality of objects in the local data center to become a backup primary object when a primary object has a fault.

14. A hierarchical method for fault tolerance in a distributed computer system:

providing a plurality of data centers;

providing a plurality of objects in each of the plurality of data centers;

providing a local sub-protocol within each data center, each local sub-protocol including an atomic broadcast protocol;

using each local sub-protocol for fault-tolerant dissemination of messages within its own data center to a plurality of local objects;

activating a plurality of the local sub-protocols from a single data center of the plurality of data centers using a propagation message sent in a fault-tolerant manner in a single round-trip message in the absence of faults;

sending the propagation message only once to each of the plurality of data centers that is not suspected of having a receiver object that is crashed; and sending the propagation message at least twice to each of the plurality of data centers that is suspected of having a receiver object that is crashed.

15. The hierarchical method as claimed in claim 14 including:

responding to the propagation message in the other of the plurality of data centers includes providing an acknowledgement to the data center in the plurality of data centers from one of the plurality of objects therein.

16. The hierarchical method as claimed in claim 14 including:

responding to the propagation message in the other of the plurality of data centers includes providing an acknowledgement to the data center in the plurality of data centers from one of the plurality of objects therein; and waiting a time for the acknowledgement and sending a second propagation message to another of the plurality of objects in the other of the plurality of data centers if the acknowledgement is not received within the time.

17. The hierarchical method as claimed in claim 14 including:

responding to the first propagation message in the other of the plurality of data centers includes providing an acknowledgement to the data center in the plurality of data centers from one of the plurality of objects therein;

waiting a time for the acknowledgement and sending a second propagation message to another of the plurality of objects in the other of the plurality of data centers if the acknowledgement is not received within the time; and sending the first and second propagation messages includes sending first and second unique identifiers.

18. The hierarchical method as claimed in claim 14 wherein:

activating the local sub-protocol includes using the propagation message with a unique identifier.

19. The hierarchical method as claimed in claim 14 wherein:

using the local sub-protocol to determine when faults occur in the plurality of objects in a local data center; and including:

determining an alternate object in the plurality of objects in the local data center to become a backup primary object when a primary object has a fault.

20. The hierarchical method as claimed in claim 14 wherein:

using the local sub-protocol to developing a suspicion of the occurrence faults in the plurality of objects in a local data center;

and including:

determining an alternate object in the plurality of objects in the local data center to become a backup primary object when a primary object has a fault.

21. A method, comprising:

generating, by a first object in a first data center, a request to invoke other objects in a plurality of other data centers;

relaying a message from the first data center to a receiver object in each of the plurality of data centers;

activating, by the receiver object in each of the plurality of data centers, a broadcast protocol to disseminate the message locally to a plurality of objects within each of the plurality of data centers;

waiting, by the first data center, for an acknowledgement message from each of the plurality of data centers to acknowledge receipt of the message;

failing to receive, by the first data center, an acknowledgement message from one of the data centers; and resending the message from the first data center to a second receiver object in the one of the data centers after failing to receive, by the first data center, the acknowledgement message from the one of the data centers, wherein a second object in the first data center relays the message to each of the plurality of data centers.

22. The method of claim 21 further comprising:

suspecting, within the first data center, a crash of the second object;

broadcasting, within the first data center, a suspicion of the crash to a plurality of objects in the first data center;

agreeing, by the plurality of objects in the first data center, upon the suspicion.

23. The method of claim 22 further comprising:

designating, by the plurality of objects in the first data center, a third object to relay messages to each of the plurality of data centers.

24. The method of claim 23 further comprising:

ensuring, by the third object, that all messages that were designated to be sent to other data centers by the second object are in fact sent to the other data centers.

25. A method, comprising:

generating, by a first object in a first data center, a request to invoke other objects in a plurality of other data centers;

relaying a message from the first data center to a receiver object in each of the plurality of data centers;

activating, by the receiver object in each of the plurality of data centers, a broadcast protocol to disseminate the message locally to a plurality of objects within each of the plurality of data centers;

waiting, by the first data center, for an acknowledgement message from each of the plurality of data centers to acknowledge receipt of the message;

failing to receive, by the first data center, an acknowledgement message from one of the data centers;

resending the message from the first data center to a second receiver object in the one of the data centers after failing to receive, by the first data center, the acknowledgement message from the one of the data centers;

sending the message only once to each of the plurality of data centers that is not suspected of having a receiver object that is crashed; and sending the message at least twice to each of the plurality of data centers that is suspected of having a receiver object that is crashed.

* * * * *